Figure 1:
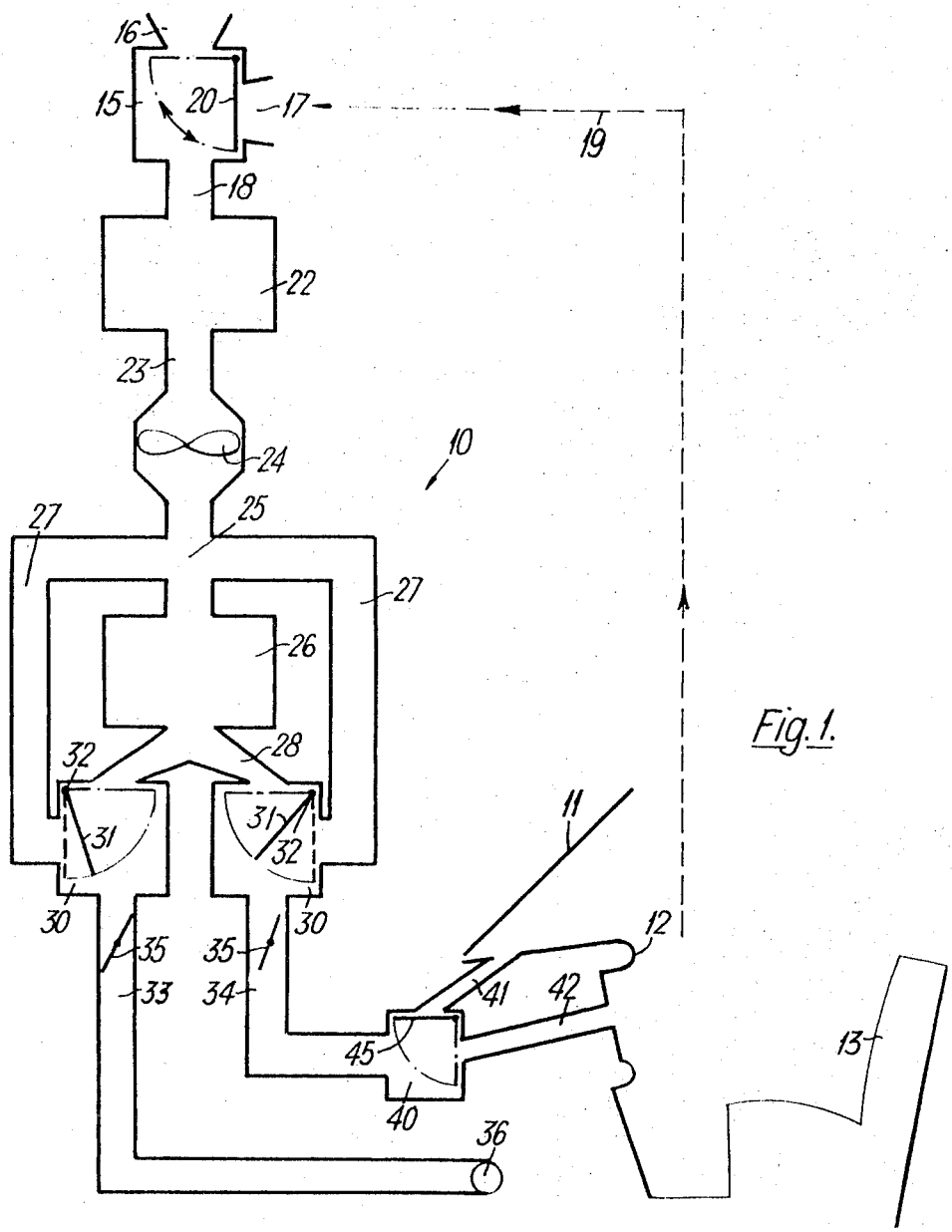

United States Patent
Coyle et al.

[15] 3,656,541
[45] Apr. 18, 1972

[54] VEHICLE AIR CONDITIONING SYSTEM

[72] Inventors: John Cadden Coyle, Wybunbury, near Nantwich; Derrick Coulson, Wistaston, both of England

[73] Assignee: Rolls-Royce Limited, Derby, England

[22] Filed: Jan. 21, 1971

[21] Appl. No.: 108,424

[52] U.S. Cl. .................................. 165/16, 165/24, 165/27, 165/35, 165/42, 165/65, 165/59
[51] Int. Cl. ..................................................... F25b 29/00
[58] Field of Search .................... 165/23, 25, 27, 28, 35, 41, 165/65, 16, 24

[56] References Cited

UNITED STATES PATENTS

| | | | |
|---|---|---|---|
| 2,318,706 | 5/1943 | Newton | 165/16 |
| 3,183,962 | 5/1965 | Steinhagen | 165/42 |
| 3,217,790 | 11/1965 | Wasson | 165/16 |
| 3,263,739 | 8/1966 | Gaskell | 165/25 |
| 3,315,730 | 4/1967 | Weaver | 165/23 |
| 3,520,355 | 7/1970 | Rulth | 165/42 |

Primary Examiner—William J. Wye
Attorney—Cushman, Darby & Cushman

[57] ABSTRACT

The invention concerns a vehicle air conditioning system comprising an air intake, a refrigerant evaporator, a heater and a heater by-pass conduit, first and second outlet ducting for separately conveying air to respective outlets in the upper and lower parts of the vehicle interior respectively, air-mixing means associated with each said outlet ducting and which is automatically settable to feed to the said outlet ducting air which has passed through the evaporator and selectively through the heater and the heater by-pass conduit, settable mass flow regulating means in each said outlet ducting, air temperature sensing means adapted to measure the air temperature in the respective outlet ducting, the ambient temperature, and the temperature inside the vehicle, and adapted automatically to control the air-mixing means and the mass flow regulating means, means for closing the outlet of the second outlet ducting and diverting the entire output of the system to the first outlet ducting, and a manual device for varying the setting of the said sensing means.

16 Claims, 3 Drawing Figures

Inventors
JOHN CADDEN COYLE
DERRICK COULSON
By Cushman, Darby & Cushman
Attorneys

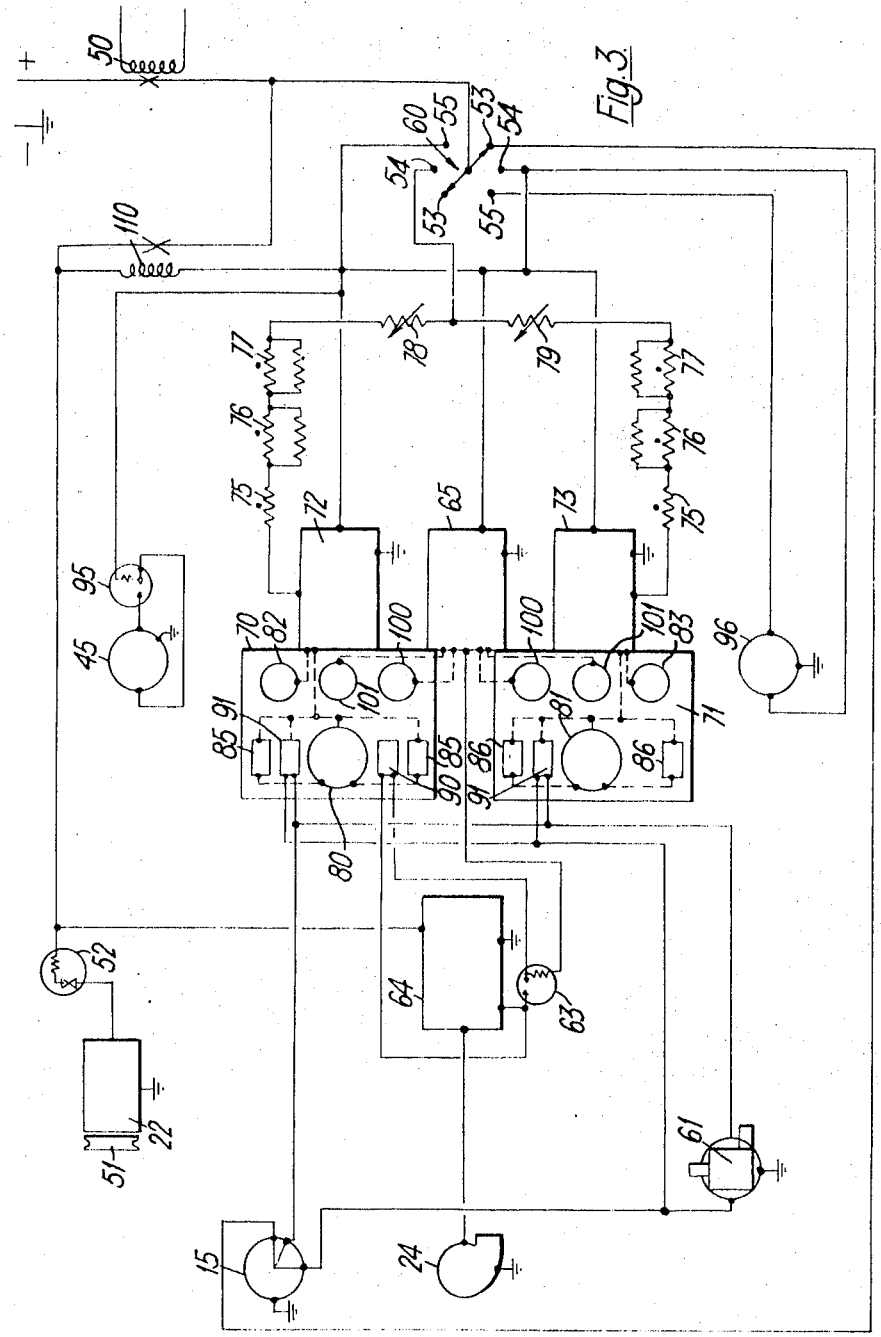

VEHICLE AIR CONDITIONING SYSTEM

This invention relates to vehicle air conditioning systems, and although it is not so restricted, it will be particularly described with reference to a motor car air conditioning system.

According to the present invention there is provided a vehicle air conditioning system comprising an air intake, a refrigerant evaporator, a heater and a heater by-pass conduit, first and second outlet ducting for separately conveying air to respective outlets in the upper and lower parts of the vehicle interior respectively, air-mixing means associated with each said outlet ducting and which is automatically settable to feed to the said outlet ducting air which has passed through the evaporator and through the heater and/or the heater by-pass conduit, settable mass flow regulating means in each said outlet ducting, air temperature sensing means adapted to measure the air temperature in the respective outlet ducting, the ambient temperature, and the temperature inside the vehicle, and adapted automatically to control the air-mixing means and the mass flow regulating means, means for closing the outlet of the second outlet ducting and diverting the entire output of the system to the first outlet ducting, and a manual device for varying the setting of the said sensing means.

Preferably the first outlet ducting has two spaced apart outlets for supplying air to the windscreen and/or the dashboard of the vehicle, respectively, there being a valve for proportioning the amount of air passing to said outlets.

The air intake may be provided with a valve adapted to control a connection to the interior of the vehicle so as to receive recirculated air, and a fresh air inlet.

In a preferred embodiment, a steplessly variable speed fan is connected between the outlet of the evaporator and the inlets to the heater and the heater by-pass conduit.

The speed of the fan is preferably controlled by electronic control means responsive to the amounts of required airflow in the respective outlet ductings which in turn is arranged to be dependent upon the settings of the air-mixing and mass flow regulating means.

The electronic control means may be arranged to be preferentially responsive to the amount of airflow required in the first outlet ducting.

Optionally, to one side of a predetermined condition the valve of the air intake prevents recirculated air from passing into the air intake, whereas to the other side of said predetermined temperature the control of said valve is such that at least the major portion of the air passing into the air intake is recirculated air.

The fan may be controlled by a thermostat which is responsive to the temperature of the coolant in the engine of said vehicle to prevent the fan from operating until the coolant temperature has reached a predetermined value.

Preferably means are provided to override the thermostat in predetermined conditions.

The heater is preferably a coolant-air heat-exchanger, there being shut-off means for shutting down the circulation of coolant through the heater at a selected sensed temperature.

The air temperature sensing means may include an actual vehicle interior temperature sensor and a servo arrangement for regulating the temperature and quantity of the air entering said interior in accordance with the difference between the actual and preselected vehicle interior temperature.

Each air mixing means may include a continuously movable valve movement of which is controlled by a servo module responsive to the output of a balanced amplifier having inputs derived from a comparator arrangement adapted to compare actual and preselected temperatures and a feed back potentiometer, respectively.

Preferably the mass flow regulating means includes a continuously movable valve for each outlet ducting, the said valve being mechanically linked with the respective air-mixing valve.

A thyristor may be provided to control a motor driving the fan, the said electronic control means being adapted to vary the mark-space ratio of the on-off pulse for switching the thyristor, the said electronic control means being responsive to the settings of the air mass flow regulating means and the air-mixing means.

Preferably the means for diverting the entire output of the system through the first outlet ducting includes an override control responsive to the air-mixing valve being at either extreme of its travel.

The scope of the invention also includes a vehicle, e.g. a motor car, provided with an air conditioning system as set forth above.

Figure 2:
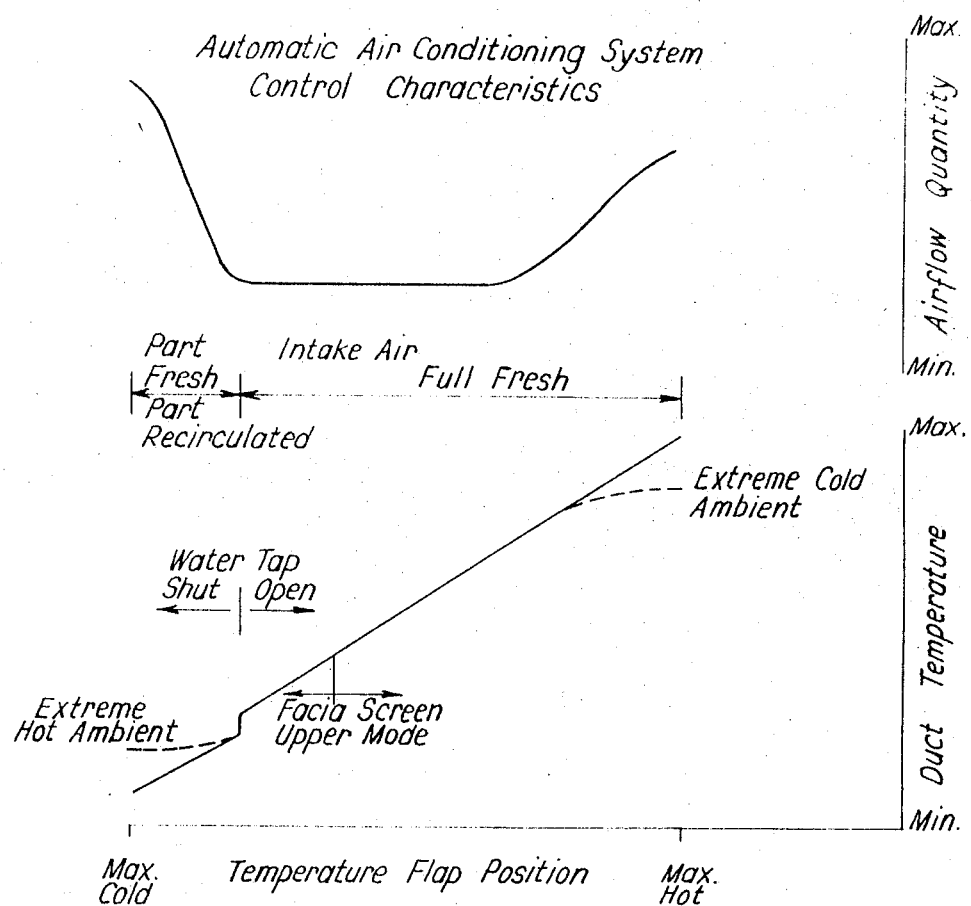

The invention will now be described, merely by way of example, with reference to the accompanying drawings, in which:

FIG. 1 is a schematic view of a motor car air conditioning system in accordance with the present invention, FIG. 2 is a graphical representation of the relationship between various parameters of the system shown in FIG. 1, and FIG. 3 is a block diagram of the controls of the system shown in FIG. 1.

Referring to the drawings, there is shown a motor car air conditioning system generally indicated by the reference numeral 10. The motor car itself is not shown, although purely diagrammatically there is shown a windscreen 11, a dashboard 12 and a front seat 13.

The air conditioning system is located in the engine compartment of the motor car and includes an air intake chamber 15 which is provided with two inlets 16 and 17 and an outlet 18. The inlet 16 is arranged to receive fresh air, while the inlet 17 is arranged to receive air which has been recirculated from the interior of the motor car, the route of which is shown by the dotted line 19. In the intake chamber 15 is pivotally mounted a valve in the form of a flap 20, hereinafter referred to as the "fresh/recirculation air flap," which is capable of pivotally moving from its full-line position shown in FIG. 1 to its dotted-line position along a path which is also indicated in dotted lines. As will be seen, in its full-line position the fresh air inlet 16 is fully open while the recirculation inlet 17 is fully closed, while in its dotted-line position this situation is exactly reversed. Of course, the flap 20 is capable of assuming any position intermediate these two extremes, that is to say it is capable of assuming positions in which both fresh and recirculated air are admitted to the intake chamber 15.

Air from the intake chamber 15 passes via the outlet 18 to a refrigerant evaporator matrix or core 22. The evaporator 22 is arranged to cool the incoming air for all ambient temperatures above freezing point. In cooling the air, an uncontrolled proportion of moisture is extracted from the air and the amount of moisture so extracted will be dependent only upon the prevailing climatic conditions and the mass flow of the air. Some degree of air purification will take place as a result of the dehumidification process.

Air from the evaporator 22 passes via a conduit 23 to a steplessly variable speed fan 24 from which the air is delivered to a junction 25. The junction 25 is connected for flow communication to a heater 26 and to two cold air by-pass conduits 27 which respectively by-pass the heater 26. The heater 26 is in the form of a heat exchanger through which a hot liquid passes and in the preferred embodiment, in which the motor car is provided with a liquid-cooled engine, the hot liquid is coolant, usually water with additives, which has passed through the engine block of the motor car.

The heater 26 is provided with two outlet conduits 28 which communicate with respective air mixing chambers 30 each of which communicates also with one of the cold air by-pass conduits 27. Each air mixing chamber 30 is moreover provided with a valve device 31 of the pivotable flap type, which will hereinafter be referred to as a "temperature flap." Each temperature flap 31 is mounted on a respective pivot 32 to be pivotally settable at any position between the two extremes shown in broken lines in which, respectively, each air mixing chamber 30 receives only heated air from the conduits 28 or only cold air from the conduits 27. In the illustrated full-line position of the temperature flaps 31, however, the mixing chambers 30 receive both heated air and cold by-pass air. Thus the temperature flaps 31 act as a means of proportioning hot and cold air.

The air mixing chambers 30 are provided with respective outlet ducts or ductings 33, 34 which are completely separated from each other and which respectively communicate with outlets to the upper and lower parts of the motor vehicle interior. The combination of outlet ducts 33, 34 with their respective air mixing chambers 30 will be referred to as "lower" and "upper" systems. Each outlet duct 33, 34 is provided with a centrally pivoted valve device 35 which will hereinafter be referred to as "quantity flaps" since they regulate the mass flow in the outlet ducts 33, 34. Each quantity flap 35 is pivotable independently of the other quantity flap and is mechanically interlinked with its respective temperature flap 31.

The combination of the temperature flaps 31 and the quantity flaps 35, and the fan speed, enables the system to provide the optimum mass flow of air at the desired temperature in each of the separate systems, namely the upper and lower systems, notwithstanding the fact that there is a single common fan 24.

The outlet duct 33 communicates with lower outlet distribution ducting 36 communicating with the lower part of the interior of the motor car, while the outlet duct 34 communicates with a further mixing chamber 40. The mixing chamber 40 has two spaced apart outlet ducts 41 and 42 which are respectively adapted to convey air to an outlet adjacent the windscreen 11 and to an outlet or outlets in the dashboard 12. In the mixing chamber 40 is pivotally mounted a valve 45 which will hereinafter be referred to as the "upper mode flap." The upper mode flap 45 is continuously settable between the two extreme positions shown respectively in full and dotted lines in FIG. 1, and thus it will be seen that the upper mode flap 45 acts to proportion the respective amounts of air passing to the windscreen and/or to the dashboard.

The upper mode flap 45 makes it possible to cater in this preferred embodiment of the present invention for either heating the windscreen and the upper portion of the motor car interior via the windscreen duct 41 only, or providing cooling or a mild degree of heating of the upper portion of the motor car interior via the dashboard duct 42. This permits the selection of very high air temperatures for de-icing purposes whilst protecting the faces and upper body portions of the occupants of the motor car from direct impingement of uncomfortably hot air. In an arrangement described in more detail below, the upper mode flap 45 is arranged to direct all the air to the dashboard outlet 42 below a predetermined temperature in the outlet ducts 33, 34.

Referring now to the schematic graphs shown in FIG. 2, the lower part of the graph shows the relationship between the position of a temperature flap 31 and the temperature in the appropriate outlet duct 33, 34. As will be made clear in more detail below, the position of the temperature flap is set in accordance with temperature sensors located in the outlet ducts 33, 34 and ambient and in-car sensors in accordance with the comparison of actual total sensed temperature and the desired temperature selected by an occupant of the motor vehicle. The graph shows in broken lines the extremes of ambient temperature as well.

The relationship between the outlet duct temperature and the position of the temperature flap is relatively uncomplicated, although simultaneous air flow quantity control of both upper and lower systems is complicated by the fact that only a single fan 24 is provided. However, as will be discussed in more detail below, this difficulty is substantially overcome by controlling the fan speed by whichever of the two systems demands the greater air flow, and this is achieved through an electronic priority system also discussed below. In this way, at any instant the air flow from the fan 24 is controlled by only one system, and modulation of the mass flow in the other system is achieved by that system's quantity flap 35 which is controlled by its associated temperature flap 31.

Referring to the upper graph in FIG. 2, it will be seen that at high cooling demand a mixture of fresh and recirculated air is used, whereas at all other times the supply is all fresh air and therefore the flap valve 20 is suitably controlled to achieve this aim, as will be described in more detail below. The change-over point occurs at the so-called "water tap shut/open point." This water tap, of course, refers to the conventional engine cooling and air heating arrangement of a motor car in which the heater is located in a by-pass duct of the coolant between the engine block and the coolant pump inlet connection, with a tap just upstream of the heater.

Another feature of the graph that requires comment is the point on the lower graph referred to as the "upper mode point" which refers to the position of the upper mode flap 45. To the left of this point, as seen in FIG. 2, the flap 45 is in its full-line position in FIG. 1 in which all the air in the upper system is channelled through the outlet duct 42 to the dashboard 12, while to the right of this point the flap 45 is in its broken-line position in which all the air is channelled through the outlet 41 to the windscreen 11.

Turning now to FIG. 3, there is shown a block diagram showing the controls of the air conditioning system of the present invention, including an electric circuit. As can be seen, the electric circuit is a negative earth circuit and there is a relay 50 associated with the engine starter motor so that, when the latter is energized, the whole air conditioning system is de-energized.

The refrigerant compressor 22 is shown on the upper left portion of this block diagram and is provided with an electromagnetic clutch 51 adapted to be energised at ambient temperatures above freezing point by an electrical thermostat 52. The fan 24 and the air intake chamber 15 are also schematically represented on the left-hand portion of the block diagram with the fresh/recirculated air flap 20 having three electrical switch positions substantially corresponding to the conditions of fresh air only, 20 percent fresh air and 80 percent recirculated air, and 100 percent recirculated air being circulated. At the right-hand side of this diagram a manually operable selector switch assembly 60 is shown as having contacts 53, 54, 55 respectively corresponding to "off," "automatic" and "de-ice." The water tap is shown at 61 with appropriate contacts for its open and closed positions, the open position being connected to the "fresh air only" contact of the fresh air/recirculation flap actuator, while the "closed" contact of the water tap 61 is connected to the "80 percent recirculation contact" position.

The fan 24 is connected to a fan delay thermostat 63 via a fan speed control constituted by a thyristor pack 64 to which further reference will be made below. The other side of the fan delay thermostat 63 is connected to a fan priority and speed module 65, also described in greater detail below, and the fan delay thermostat 63 is effective in preventing cold air from being blown into the interior of the motor car when the selector switch 60 has been set to the "automatic" contact 54 and rheostats 78, 79, referred to below, have been set for heating, but the fan delay thermostat 63 will cut out when the water coolant of the engine has risen to a predetermined temperature. However, the fan delay thermostat 63 is also connected to an upper servo unit 70 which is effective in inhibiting operation of the fan delay thermostat 63 when the upper air system is operating to the left of the upper mode point in FIG. 2.

In addition to the upper servo unit 70 there is also a lower servo unit 71. The function of these servo units 70, 71 is to maintain automatically the temperature in the interior of the car at the selected temperatures, there being a servo unit for each of the two outlet ducts 33, 34.

The servo units 70 and 71 are connected to three modules, namely an upper servo module 72, the already mentioned fan priority and speed module 65, and a lower servo module 73. The upper and lower servo modules 72 and 73 are respectively connected to a series of thermistors 75, 76 and 77 for respectively measuring the "in-car" temperature, the ambient temperature and the temperature of the outlet ducts 33, 34. The upper and lower series of thermistors 75, 76, 77 are connected to the two rheostats 78 and 79 which are, respectively, the upper and lower temperature selectors. The junction between the rheostats 78 and 79 is connected to the "automatic" contact 54 of the selector switch 60.

It will be noted that the ambient and duct thermistors 76 and 77 have respective resistors connected in parallel to ensure control of the contribution of each to the overall effect.

The upper and lower servo modules 72 and 73 are substantially similar and basically comprise a balanced amplifier giving zero output to a respective servo motor 80, 81 within the servo units 70, 71 respectively when the input potentials of the balanced amplifier are at a similar potential. The upper and lower series of thermistors 75, 76, 77 are respectively connected to one of the inputs on the respective balanced amplifier, while feed-back potentiometers 82, 83 in the servo units 70, 71 respectively are respectively connected to the other input of the balanced amplifier. The servo motors 80, 81 act to increase or decrease the temperature and quantity of the air entering the motor car interior when the upper or lower "in-car" thermistors 75 indicate a temperature different from the selected value. Thus movement of the servo motors 80, 81 adjusts the position of the relevant temperature and air quantity flaps 31 or 35. In addition to the servo motors 80 and 81, the servo units 70 or 71 also contain the feed-back potentiometers 82, 83 for the respective servo module 72 and 73. The servo units 70, 71 also include a pair of limiting means 85 and 86 for limiting the movement of the servo motor 80 or 81. The upper servo unit 70 is moreover provided with a mode position control 90 connected to the fan delay thermostat 63 for inhibiting the operation of that thermostat when the upper air system is operating to the left of the upper mode point, as already referred to.

The upper and lower servo units 70 and 71 also include respective controls 91 connected on the one hand between the contact for "80 percent recirculation" of the fresh air/recirculation flap actuator and the "closed" contact of the water tap 61, and on the other hand to the "open" contact of the water tap 61 and the fresh air contact of the fresh air/recirculation flap actuator. The upper mode flap actuator 45 is shown on the block diagram of FIG. 3 as being connected to a mode change thermostat 95 which is also connected to the upper servo module 72. This arrangement permits the upper mode flap to direct all the air to the dashboard outlets below a predetermined temperature.

Reference has been made previously to the fact that the system can divert its entire output to the upper air system at the extremes of hot and cold performance points. This is achieved by the so-called "lower quantity flap override actuator" 96 which is actuated, at the hot end, when the selector switch 60 is positioned or set to select de-icing, and is automatically actuated, at the cold end, by the upper servo module 72.

Referring now to the fan priority and speed module 65, this contains the controls for steplessly varying the fan speed and moreover in such a way that the speed is controlled by the system requiring the greater mass flow of air. As can be seen, the fan priority and speed module 65 is connected to respective fan priority controls 100 in the respective servo units 70 and 71, and moreover the module 65 is also connected to fan speed control 101 in each of the servo units 70 and 71. The fan speed control 101 operate in such a way that when any adjustment of the temperature and/or quantity flaps takes place, there is a corresponding change in the fan rotor speed. The fan speed controls 101 are basically potentiometers the output signals of which are processed electronically to vary the mark/space ratio of the on/off pulse controlling the fan speed thyristor pack 64 which regulates the current flow to the fan motor and varies its speed by adjusting, e.g. turning on and off, its supply for varying lengths of time.

The fan priority control 100 are essentially balanced amplifier arrangements having two inputs obtained from potentiometers fitted to the upper and lower servo units which are adjusted by movement of the temperature flaps 31. The output of each amplifier operates a relay 110 to give control to the system requiring most air. When equal signals are provided, the arrangement is such that the upper system retains control of the fan speed.

If desired, instead of providing the fan priority and speed module 65, the potentiometers of the fan speed controls 101 may be connected in parallel to effect electrical averaging of the air flow required by the upper and lower systems. In this case, the maximum fan speed is achieved when either system is on "full hot" or "full cold," but minimum fan speed is selected only when both systems are in mid position. In this case, moreover, a power transistor (not shown) may be used to switch the fan motor in place of the thyristor pack 64.

We claim:

1. A vehicle air conditioning system comprising an air intake, a refrigerant evaporator, a heater and a heater by-pass conduit, first and second outlet ducting for separately conveying air to respective outlets in the upper and lower parts of the vehicle interior respectively, air-mixing means associated with each said outlet ducting and which is automatically settable to feed to the said outlet ducting air which has passed through the evaporator and selectively through the heater and the heater by-pass conduit, settable mass flow regulating means in each said outlet ducting, air temperature sensing means adapted to measure the air temperature in the respective outlet ducting, the ambient temperature, and the temperature inside the vehicle, and adapted automatically to control the air-mixing means and the mass flow regulating means, means for closing the outlet of the second outlet ducting and diverting the entire output of the system to the first outlet ducting, and a manual device for varying the setting of the said sensing means.

2. A system as claimed in claim 1 wherein the first outlet ducting has two spaced apart outlets for supplying air selectively to the windscreen and the dashboard of the vehicle, respectively, there being a valve for proportioning the amount of air passing to said outlets.

3. A system as claimed in claim 1 wherein the air intake is provided with a valve adapted to control a connection to the interior of the vehicle so as to receive recirculated air, and a fresh air inlet.

4. A system as claimed in claim 1 wherein a steplessly variable speed fan is connected between the outlet of the evaporator and the inlets to the heater and the heater by-pass conduit.

5. A system as claimed in claim 4 wherein the speed of the fan is controlled by electronic control means responsive to the amounts of required airflow in the respective outlet ductings which in turn is arranged to be dependent upon the settings of the air-mixing and mass flow regulating means.

6. A system as claimed in claim 5 wherein the electronic control means is arranged to be preferentially responsive to the amount of airflow required in the first outlet ducting.

7. A system as claimed in claim 3 wherein to one side of a predetermined condition the valve of the air intake prevents recirculated air from passing into the air intake, whereas to the other side of said predetermined condition the control of said valve is such that at least the major portion of the air passing into the air intake is recirculated air.

8. A system as claimed in claim 4 wherein the fan is controlled by a thermostat which is responsive to the temperature of the coolant in the engine of said vehicle to prevent the fan from operating until the coolant temperature has reached a predetermined value.

9. A system as claimed in claim 8 wherein means are provided to override the thermostat in predetermined conditions.

10. A system as claimed in claim 1 wherein the heater is a coolant-air-heat-exchanger, there being shut-off means for shutting down the circulation of coolant through the heater at a selected sensed temperature.

11. A system as claimed in claim 1 wherein the air temperature sensing means includes an actual vehicle interior temperature sensor and a servo arrangement for regulating the temperature and quantity of the air entering said interior in accordance with the difference between the actual and preselected vehicle interior temperature.

12. A system as claimed in claim 11 wherein each air mixing means include a continuously movable valve, movement of which is controlled by a servo module responsive to the output of a balanced amplifier having inputs derived from a comparator arrangement adapted to compare actual and preselected temperatures and a feed back potentiometer, respectively.

13. A system as claimed in claim 12 wherein the mass flow regulating means includes a continuously movable valve for each outlet ducting, the said valve being mechanically linked with the respective air-mixing valve.

14. A system as claimed in claim 5 wherein a thyristor is provided to control a motor driving the fan, the said electronic control means being adapted to vary the mark-space ratio of the on-off pulse for switching the thyristor, the said electronic control means being responsive to the settings of the air mass flow regulating means and the air-mixing means.

15. A system as claimed in claim 12 wherein the means for diverting the entire output of the system through the first outlet ducting includes an override control responsive to the air-mixing valve being at either extreme of its travel.

16. A system as claimed in claim 5 wherein a transistor is provided to control a motor driving the fan, the said electronic control means being adapted to vary the mark-space ratio of the on-off pulse for switching the transistor, the said electronic control means being responsive to the settings of the air mass flow regulating means and the air-mixing means.

* * * * *

UNITED STATES PATENT OFFICE
CERTIFICATE OF CORRECTION

Patent No. 3,656,541         Dated April 18, 1972

Inventor(s) John Cadden Coyle

It is certified that error appears in the above-identified patent and that said Letters Patent are hereby corrected as shown below:

In the above-identified patent, please add the following to the front page format:

[30]      Foreign Application Priority Data

January 29, 1970   Great Britain. . . . . . . 4413/70

Signed and sealed this 22nd day of August 1972.

(SEAL)
Attest:

EDWARD M. FLETCHER, JR.                ROBERT GOTTSCHALK
Attesting Officer                        Commissioner of Patents